(12) United States Patent
Kim et al.

(10) Patent No.: US 8,089,919 B2
(45) Date of Patent: *Jan. 3, 2012

(54) PACKET TRANSMISSION ACKNOWLEDGEMENT IN WIRELESS COMMUNICATION SYSTEM

(75) Inventors: Bong Hoe Kim, Ansan-si (KR); Joon Kui Ahn, Seoul (KR); Hak Seong Kim, Seoul (KR); Dong Wook Roh, Seoul (KR); Dong Youn Seo, Seoul (KR); Seung Hwan Won, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 816 days.

This patent is subject to a terminal disclaimer.

(21) Appl. No.: 11/929,024

(22) Filed: Oct. 30, 2007

(65) Prior Publication Data

US 2008/0056179 A1    Mar. 6, 2008

Related U.S. Application Data

(63) Continuation of application No. 11/200,560, filed on Aug. 9, 2005, now Pat. No. 7,372,831.

(30) Foreign Application Priority Data

Aug. 11, 2004 (KR) .......................... 10-2004-063122
Sep. 15, 2004 (KR) .......................... 10-2004-080529

(51) Int. Cl.
    *H04W 4/00* (2009.01)
(52) U.S. Cl. ...................................................... 370/328
(58) Field of Classification Search .................. None
    See application file for complete search history.

(56) References Cited

U.S. PATENT DOCUMENTS

| 6,955,918 | B2 | 10/2005 | Haumont et al. |
| 7,372,831 | B2 * | 5/2008 | Kim et al. ...................... 370/328 |
| 2003/0072292 | A1 | 4/2003 | Yoon et al. |
| 2003/0165120 | A1 | 9/2003 | Uesugi et al. |
| 2003/0202574 | A1 | 10/2003 | Budka et al. |

(Continued)

FOREIGN PATENT DOCUMENTS

CN     1389044     1/2003

(Continued)

OTHER PUBLICATIONS

Kawagishi, M.; Sampei, S.; Morinaga, N.; "A Novel Reservation TDMA Based Multiple Access Scheme Using Adaptive Modulation for Multimedia Wireless Communication Systems." In: 48th IEEE Vehicular Technology Conference, 1998. VTC98. Ottawa, Ontario, Canada. May 18-21, 1998, New York, NY, USA, IEEE. pp. 112-116.

(Continued)

*Primary Examiner* — Anh-Vu Ly
(74) *Attorney, Agent, or Firm* — Lee, Hong, Degerman, Kang & Waimey

(57) ABSTRACT

Transmitting an acknowledgement/negative acknowledgement (ACK/NACK) signal in association with a packet transmitted on an uplink is disclosed. The method includes the steps of receiving a packet transmitted from a user equipment, decoding the packet, and determining whether the packet has been successfully decoded, transmitting an ACK signal or a NACK signal, based on the decoding result. Different transmission powers are allocated for the ACK signal and the NACK signal. Alternatively, the transmission power for the NACK signal selectively has an OFF level. The present invention optimizes the transmission powers for downlink ACK/NACK signals in accordance with the required reception quality of each of the ACK/NACK signals, and thus, enables the system to operate efficiently.

5 Claims, 3 Drawing Sheets

U.S. PATENT DOCUMENTS

| | | |
|---|---|---|
| 2004/0100927 A1 | 5/2004 | Black et al. |
| 2004/0122531 A1 | 6/2004 | Atsuta et al. |
| 2005/0180363 A1 | 8/2005 | Yano et al. |
| 2005/0185722 A1 | 8/2005 | Abe et al. |
| 2006/0087972 A1 | 4/2006 | Jalali et al. |
| 2006/0271562 A1 | 11/2006 | Kato |
| 2006/0291389 A1 | 12/2006 | Attar et al. |
| 2007/0024444 A1 | 2/2007 | Fukuda |
| 2007/0127407 A1* | 6/2007 | Attar et al. .......... 370/318 |
| 2008/0062932 A1* | 3/2008 | Hwang .......... 370/331 |
| 2009/0253453 A1* | 10/2009 | Zhang et al. .......... 455/522 |

FOREIGN PATENT DOCUMENTS

| | | |
|---|---|---|
| CN | 1431839 A | 7/2003 |
| EP | 1313250 | 5/2003 |
| JP | 2003283473 | 10/2003 |
| KR | 10-2003-0059982 | 7/2003 |
| WO | 95-35616 | 12/1995 |
| WO | 01-33744 | 5/2001 |
| WO | 2004-038990 | 5/2004 |
| WO | 2004/038991 | 5/2004 |

OTHER PUBLICATIONS

Ghosh, A. et al.: Overview of Enhance Uplink for 3GPP W-CDMA.: In: 2004 IEEE 59th Vehicular Technology Conference. VTC 2004—Spring. Milan, Italy. May 17-19, 2004, Piscataway, NJ, USA IEEE. pp. 2261-2265.

Ghosh, et al., "Overview of Enhanced Uplink for 3GPP W-CDMA," IEEE 59th Annual Vehicular Technology Conference, 2004 (VTC 2004), vol. 4, May 17, 2004.

Qualcomm Europe, "HARQ Load in Downlink," R1-040630, 3GPP TSG-RAN WG1 #37, May 2004, XP-050098977.

Qualcomm Europe, "HARQ Channel Mapping in Downlink," R1-040723, 3GPP TSH-RAN WG1 #37-bis, Jun. 2004, XP-050112137.

QUALCOMM Europe, "HARQ Load in Downlink," R1-040551, 3GPP TSG-RAN WG1 #37, May 2004.

* cited by examiner

PACKET TRANSMISSION ACKNOWLEDGEMENT IN WIRELESS COMMUNICATION SYSTEM

CROSS REFERENCE TO RELATED APPLICATIONS

This application is a continuation of U.S. application Ser. No. 11/200,560, filed on Aug. 9, 2005, and issued as U.S. Pat. No. 7,372,831 on May 13, 2008, which pursuant to 35 U.S.C. §119, claims the benefit of earlier filing dates and right of priority to Korean Application No. P04-063122, filed on Aug. 11, 2004 and Korean Application No. P04-080529 filed on Sep. 15, 2004, the contents of which are hereby incorporated by reference herein in their entirety.

FIELD OF THE INVENTION

The present invention relates to a method for transmitting an acknowledgement/negative acknowledgement (ACK/NACK) signal, and more particularly, for transmitting an ACK/NACK signal from a network receiving packet data transmitted from a user equipment (UE) through an uplink data channel.

BACKGROUND OF THE INVENTION

The 3rd Generation Partnership Project (3GPP) is discussing application of the Hybrid Automatic Repeat Request (HARQ) scheme to a channel for high-speed transmission of packet data on the uplink. Such channel is known as an enhanced-uplink dedicated channel (E-DCH).

In an application of the HARQ system to the uplink, a network (for example, node-B) transmits, in response to a packet sent from a user equipment (UE), a negative acknowledgement (NACK) signal to the UE when it is determined, based on the results obtained after decoding the packet, that the packet is erroneously decoded, and transmits an acknowledgement (ACK) signal to the UE when it is determined that the packet is successfully decoded. The ACK/NACK signal is transmitted through a 1-bit ACK/NACK channel.

In response to reception of the NACK signal, the UE re-transmits the previously-transmitted packet. The node-B combines decoding information about the re-transmitted packet with decoding information about the previously-transmitted packet, using diverse transmission methods to enhance the reception performance for the re-transmitted packet. In this case, the ACK/NACK signal is a 1-bit signal which is transmitted on the downlink. For such an ACK/NACK signal, no channel coding is provided to protect it from interference or other adverse communication conditions. For this reason, it is necessary to use very high transmission power to enable the UE to successfully receive the ACK/NACK signal.

In the HARQ system, the NACK signal must have a higher transmission success rate than that of the ACK signal. When the UE erroneously receives an ACK signal as a NACK signal, the UE re-transmits the packet, which was already received by the node-B. Accordingly, no harm occurs other than re-transmitting the same data. However, when the UE erroneously receives a NACK signal as an ACK signal, the UE erroneously determines that the associated packet data was successfully transmitted to the node-B, and then transmits a subsequent packet. As a result, the erroneously-decoded packet can no longer be recovered at the physical layers of the node-B. The recovery of the erroneous packet must be conducted at an upper layer. As a result, the packet transmission delay is increased.

Furthermore, when the UE is in fast transit, or is in soft handover with a plurality of node-Bs, the link state between the UE and each node-B may be very weak. In this case, the ACK/NACK transmission power (in particular, the NACK transmission power) required to obtain a satisfactory ACK/NACK reception performance may be impractically high.

Accordingly, it is necessary to appropriately set the downlink ACK/NACK transmission power, taking into consideration all of the above-mentioned possibilities.

There remains therefore a need for an improved means for ACK/NACK communication in a wireless systems using the enhanced uplink dedicated channel that solves these and related problems.

SUMMARY OF THE INVENTION

Accordingly, the present invention is directed to methods for transmitting an ACK/NACK signal and determining ACK/NACK in the uplink packet transmission that substantially obviate one or more problems due to limitations and disadvantages of the related art.

An object of the present invention is to provide methods for transmitting an ACK/NACK signal and determining ACK/NACK in the uplink packet transmission, which capable of achieving efficient transmission of the ACK/NACK signal, and reliable ACK/NACK determination.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for acknowledging receipt of uplink data in a wireless communication system comprises transmitting packet data from a user equipment to at least one of a serving network and a non-serving network through a dedicated channel; receiving a first acknowledgement status indicator from the serving network in response to decoding the packet data by the serving network, wherein the first acknowledgement status indicator is transmitted using a phase shift key modulation; and receiving a second acknowledgement status indicator from the non-serving network in response to decoding the packet data by the non-serving network, wherein the second acknowledgement status indicator is transmitted using an amplitude shifting key modulation. Preferably, the dedicated channel is an enhanced uplink dedicated channel.

According to one aspect of the invention, the first acknowledgement status indicator comprises an acknowledgement indicator if the packet data is decoded without error and a negative acknowledgement indicator if the packet data is decoded with error. The second acknowledgement status indicator comprises an acknowledgement indicator if the packet data is decoded without error and no signal is received if the packet data is decoded with error. Preferably, the acknowledgement indicator comprises a positive amplitude signal.

According to another aspect of the invention, the phase shift key modulation comprises a binary phase shift key modulation. Moreover, the amplitude shifting key modulation comprises an on-off key modulation.

According to another aspect of the invention, the user equipment is in communication with the non-serving network during a soft handover.

According to another embodiment of the invention, a method of acknowledging receipt of uplink data by a network comprises receiving packet data from a user equipment through a dedicated channel; decoding the packet data; transmitting a first acknowledgement status indicator in response to decoding the packet data, wherein the first acknowledgement status indicator is transmitted using a phase shift key modulation if the network is a serving network of the user equipment; and transmitting a second acknowledgement status indicator in response to decoding the packet data, wherein the second acknowledgement status indicator is transmitted using an amplitude shifting key modulation if the network is a non-serving network of the user equipment.

According to another embodiment, a mobile terminal for communicating uplink data in a wireless communication system comprises means for transmitting packet data to at least one of a serving network and a non-serving network through a dedicated channel; means for receiving a first acknowledgement status indicator from the serving network in response to decoding the packet data by the serving network, wherein the first acknowledgement status indicator is transmitted using a phase shift key modulation; and means for receiving a second acknowledgement status indicator from the non-serving network in response to decoding the packet data by the non-serving network, wherein the second acknowledgement status indicator is transmitted using an amplitude shifting key modulation.

According to another embodiment, a network, such as node-B, for acknowledging receipt of uplink data comprises means for receiving packet data from a user equipment through a dedicated channel; means for decoding the packet data; means for transmitting a first acknowledgement status indicator in response to decoding the packet data, wherein the first acknowledgement status indicator is transmitted using a phase shift key modulation if the network is a serving network of the user equipment; and means for transmitting a second acknowledgement status indicator in response to decoding the packet data, wherein the second acknowledgement status indicator is transmitted using an amplitude shifting key modulation if the network is a non-serving network of the user equipment.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In accordance with the recent demand for enhanced uplinks in wireless mobile communication systems, a system for transmitting packets at high speed on an uplink transmission from a mobile terminal (also known as user equipment) to a node-B is needed. An enhanced-uplink dedicated channel (E-DCH) has been created with such purpose in mind.

A user equipment (UE) transmits a packet to a node-B at high speed via E-DCH. The node-B decodes the received packet, and determines success or failure of the packet reception based on the decoding result. Based on the result of the determination, the node-B transmits a physical-layer acknowledgement/negative acknowledgement (ACK/NACK) signal. Thus, a rapid automatic repeat request (ARQ) operation is carried out.

In some systems, the required reception qualities of the ACK and NACK signals may be different from each other. Accordingly, when ACK and NACK signals are transmitted via an ACK/NACK channel, it may be necessary to set the transmission power for the ACK signal and the transmission power for the NACK signal to different levels.

In some cases, it may be efficient to detect only ACK signals using a threshold. In such case, the transmission power for NACK signals has an OFF level (discontinuous transmission (DTX)). In other words, no NACK signal is transmitted. Therefore, in accordance with the present invention, ACK/NACK signal transmission power parameters are defined in order to enable setting of different transmission power levels for ACK and NACK signals transmitted from a node-B, and to enable discontinuous transmission of NACK signals. This is also known as on-off key or amplitude shift key modulation.

Alternatively, the transmission power levels of ACK and NACK signals may be different from each other. Generally, more serious problems may occur when there is an error in the NACK signal, as compared to when there is an error in the ACK signal. For this reason, higher transmission power is required for transmitting the NACK signal. If the ACK and NACK signals are transmitted using the same transmission power, the transmission of the NACK signal is carried out at an insufficient transmission power level, and the transmission of the ACK signal is carried out at an excessive transmission power level. This can cause problems.

Accordingly, if the transmission power levels for the transmission of the ACK signal and the transmission of the NACK signal are set to be different from each other, it is possible to more efficiently achieve the transmission of the ACK and NACK signals.

Figure 1:
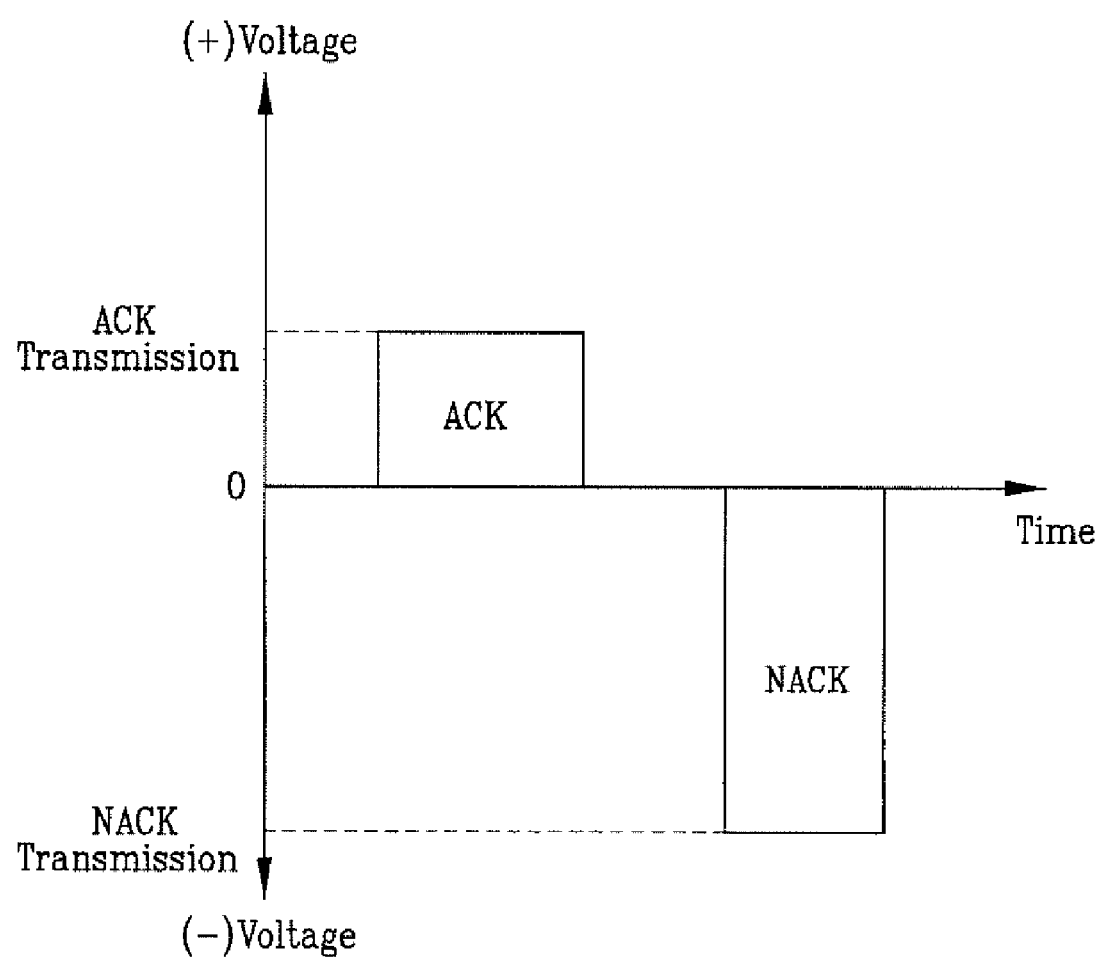
FIG. 1 is a diagram explaining an ACK/NACK signal transmission power allocation method according to a first embodiment of the present invention.

FIG. 1 is a diagram of an ACK/NACK signal transmission power allocation method according to the first embodiment of the present invention. Referring to FIG. 1, different transmission power levels are used for ACK and NACK signals, respectively, to enable the ACK and NACK signals to be transmitted in a binary phase shift key (BPSK) manner. Preferably, the BPSK modulation for transmitting the ACK/NACK signal is used for a non-handover case (for example, the UE is in communication with only a serving node-B). For purpose of explaining the present invention, the node-B may also be refer to as a network.

Preferably, the UE can determine reception of an ACK signal when the signal transmitted via a downlink ACK/NACK channel and received by the UE has a positive (+) voltage level, and reception of a NACK signal when the received signal has a negative (−) voltage level, as shown in FIG. 1.

According to the first embodiment of the present invention, the transmission power of downlink dedicated channels for UEs may be set, using offset values for the transmission power of downlink dedicated physical data channels (DPDCHs). Accordingly, the transmission powers for ACK/NACK signals transmitted on a downlink may be set, using the offset values for the transmission power of downlink DPDCHs.

The transmission powers of the ACK and NACK signals can be preferably set to different levels (for example, phase shifted) by determining parameters of the transmission power levels for the ACK and NACK signals between a radio network controller (RNC) and a node-B, respectively. For example, when it is assumed that parameter "$PO_{ACK}$" represents a power offset for a downlink DPDCH in the transmission of an ACK signal, and parameter "$PO_{NACK}$" represents a power offset for the downlink DPDCH in the transmission of a NACK signal, it is possible to control the transmission powers for the ACK and NACK signals such that they have different levels by sending the parameters from the RNC to the node-B. For example, when DTX of the NACK signal is required, this is achieved by setting the parameter "$PO_{NACK}$" to "0" ("$PO_{NACK}$"=0).

It is preferred that the parameters also be sent to UEs to enable each UE to select a desired one from a BKSP detection and a threshold detection for the ACK and NACK signals received by the UE, and to select an appropriate threshold value in the case of the threshold detection.

For a UE that is in handover, preferably soft handover, it may be possible to always control the transmission power for the NACK signal to have a DTX level. That is, for the UE that is in handover, the allocation of the downlink ACK/NACK transmission power may be achieved in such a manner that the transmission power for the ACK signal is set to be higher than a predetermined threshold value, using the parameter "$PO_{NACK}$", that is, the power offset for the downlink DPDCH in the transmission of the ACK signal, and the transmission power for the NACK signal is set to be "0" (OFF). It is preferred that the parameter "$PO_{NACK}$" also be sent to the UE, in order to enable the UE to select an appropriate threshold value for reception of the ACK/NACK signals.

Figure 2:
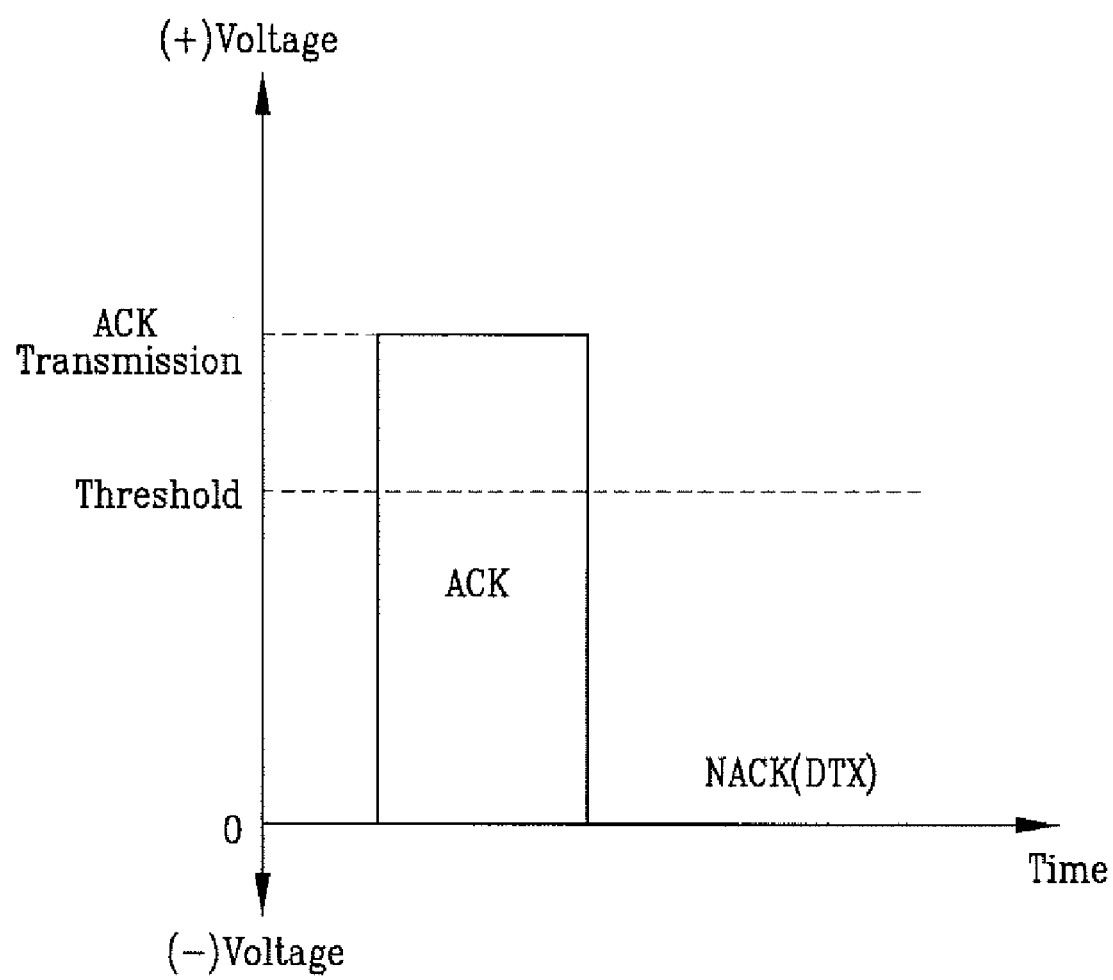
FIG. 2 is a diagram explaining an ACK/NACK signal transmission power allocation method according to a second embodiment of the present invention.

FIG. 2 is a diagram of an ACK/NACK signal transmission power allocation method according to another embodiment of the present invention.

When the downlink ACK/NACK channel, through which the node-B transmits an ACK/NACK signal, is in a degraded state, the transmission power for the ACK/NACK signal may be insufficient. Accordingly, it is necessary to preferentially secure the success of the NACK signal transmission, over the success of the ACK signal transmission.

In order to preferentially secure the success of the NACK signal transmission, allocation of signal transmission power may be carried out in accordance with the method illustrated in FIG. 2. That is, only the ACK signal may be transmitted using transmission power of a predetermined level under the condition in which the transmission power for the NACK signal has an OFF level (DTX). The transmission of ACK signal using a predetermined amplitude and discontinued transmission of NACK signal are known as amplitude shift key modulation. Preferably, the UE may detect ACK signal using a threshold. That is, the UE determines reception of an ACK signal when the signal transmitted via a downlink ACK/NACK channel and received by the UE has a voltage level higher than a predetermined threshold value, and reception of a NACK signal when the received signal has a voltage level not higher than the predetermined threshold value.

Where the threshold value for the ACK/NACK detection is set to be sufficiently high at the side of the UE, it is possible to secure a desired probability of transmission success of NACK signals even when the transmission power for the ACK signal is insufficient.

A method for efficiently setting transmission powers for ACK/NACK signals in accordance with the second embodiment of the present invention will be described.

According to the second embodiment, the amplitude shifting key modulation is applied, preferably during a soft handover case. In other words, the UE is in communication with a serving cell as well as at least one non-serving cell.

In the second embodiment, the RNC informs the node-B of whether or not the transmission power for the NACK signal must have an OFF (DTX) level, taking into consideration whether or not the associated UE is in soft handover, and other conditions associated with transmission of the ACK and NACK signals. For example, physical layers of the node-B may transmit a NACK signal, using NACK signal transmission power set to "0" (for example using a signal called "NACK_PW_OFF") when a parameter received from an upper layer has a value of 1, and using NACK signal transmission power determined by the RNC when the received parameter has a value of 0. Information about the transmission power levels for the ACK/NACK signals is preferably sent from the RNC to the node-B.

When the NACK signal transmission power has a level other than "0" in the above-described example, a single parameter for the transmission power level determined by the RNC may be used to set the transmission powers for the ACK and NACK signals such that they have the same level, for easy implementation of the above-described transmission power setting. The parameter may be "$PO_{ACK/NACK}$" which is an offset value for the transmission power of the downlink DPDCH for transmission of ACK/NACK signals. Preferably, the parameter "$PO_{ACK/NACK}$" must also be sent to the UE in order to enable the UE to select an appropriate threshold value for reception of ACK/NACK signals.

The transmission powers for the ACK and NACK signals may be independently set using two independent parameters, respectively, in order to enable the node-B to more efficiently use power. The transmission power for the ACK signal is preferably set using the power offset for the downlink DPDCH in the ACK signal transmission, namely, "$PO_{ACK}$", whereas the transmission power for the NACK signal can be set using the power offset for the downlink DPDCH in the NACK signal transmission, for example, "$PO_{NACK}$". In this case, the value "$PO_{ACK}$" must also be sent to the UE in order to enable the UE to select an appropriate threshold value for reception of the ACK/NACK signals.

Figure 3:
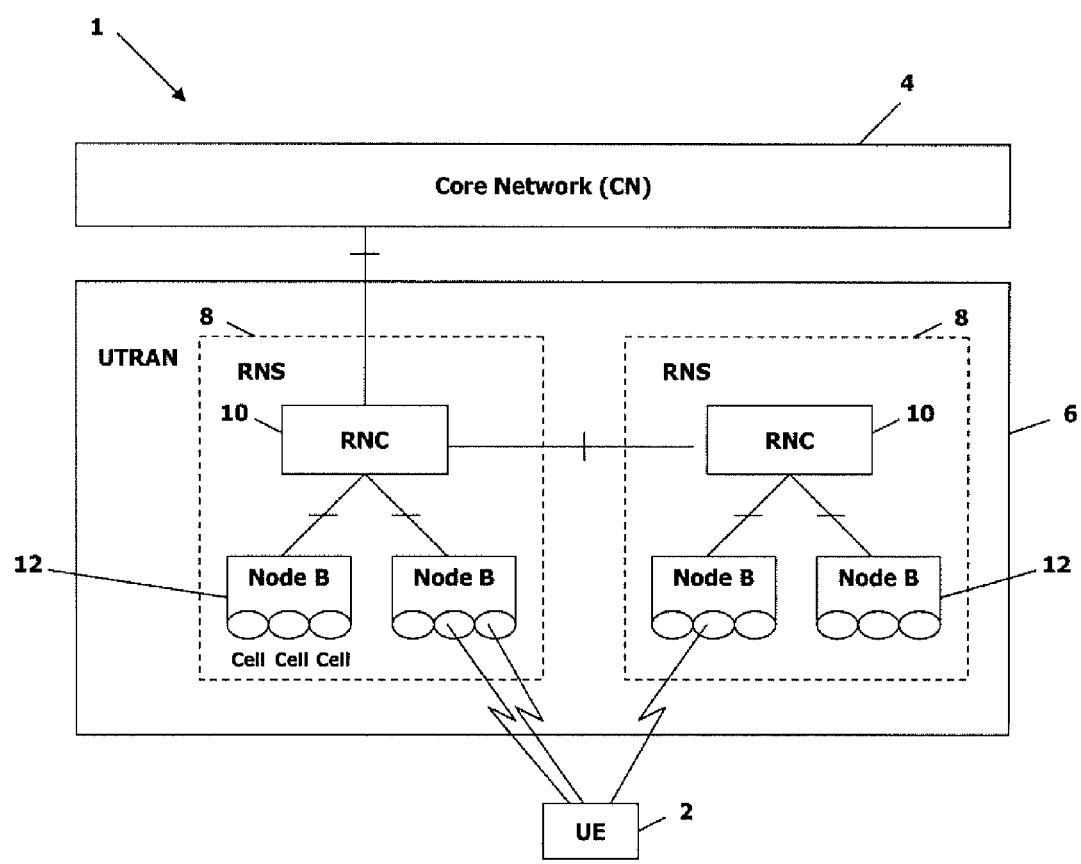
FIG. 3 illustrates a wireless communication system implementing the present invention.

FIG. 3 illustrates a wireless communication system implementing the present invention. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network.

The UTRAN 6 includes a plurality of radio network subsystems (RNS) 8, each of which comprises one radio network controller (RNC) 10 for a plurality base stations, or node-Bs 12. The RNC 10 connected to a given base station 12 is the controlling RNC for allocating and managing the common resources provided for any number of UEs 2 operating in one cell. One or more cells exist in one node-B. The controlling RNC 10 controls traffic load, cell congestion, and the acceptance of new radio links. Each node-B 12 may receive an uplink signal from a UE 2 and may transmit a downlink signals to the UE 2. Each node-B 12 serves as an access point enabling a UE 2 to connect to the UTRAN 6, while an RNC 10 serves as an access point for connecting the corresponding node-Bs to the core network 4.

As apparent from the above description, the present invention can optimize the transmission powers for downlink ACK/NACK signals in accordance with the required reception quality of each of the ACK/NACK signals, and thus, enables the system to operate efficiently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting an acknowledgement/negative acknowledgement (ACK/NACK) signal at a node-B in response to a packet received on an uplink, the method comprising:

receiving a packet from a user equipment (UE);
decoding the packet;
determining whether the packet has been successfully received based on the decoding of the packet;
transmitting an ACK signal to the UE if it is determined that the packet has been successfully received;
transmitting a NACK signal to the UE if it is determined that the packet has not been successfully received;
receiving information regarding transmission power levels for the ACK signal and the NACK signal from a radio network controller (RNC), wherein the information regarding the transmission power levels comprises information indicating whether a transmission power of the NACK signal must have a level of 0;
transmitting the information regarding the transmission power levels to the UE; and
determining the transmission power levels for the ACK signal and the NACK signal based on the information regarding the transmission power levels.

2. The method of claim 1, wherein the information indicating whether a transmission power of the NACK signal must have a level of 0 indicates that the transmission power of the NACK signal must have a level of 0 when the UE is in handover.

3. The method according to claim 1, wherein the information regarding the transmission power levels for the ACK and NACK signals further comprises information indicating a transmission power of the ACK signal and a transmission power of the NACK signal based on power offset values for a dedicated physical data channel (DPDCH).

4. The method according to claim 3, wherein the transmission power of the ACK signal and the transmission power of the NACK signal have a same level.

5. The method according to claim 3, wherein the transmission power of the ACK signal and the transmission power of the NACK signal have levels independent of each other.

* * * * *